UNITED STATES PATENT OFFICE.

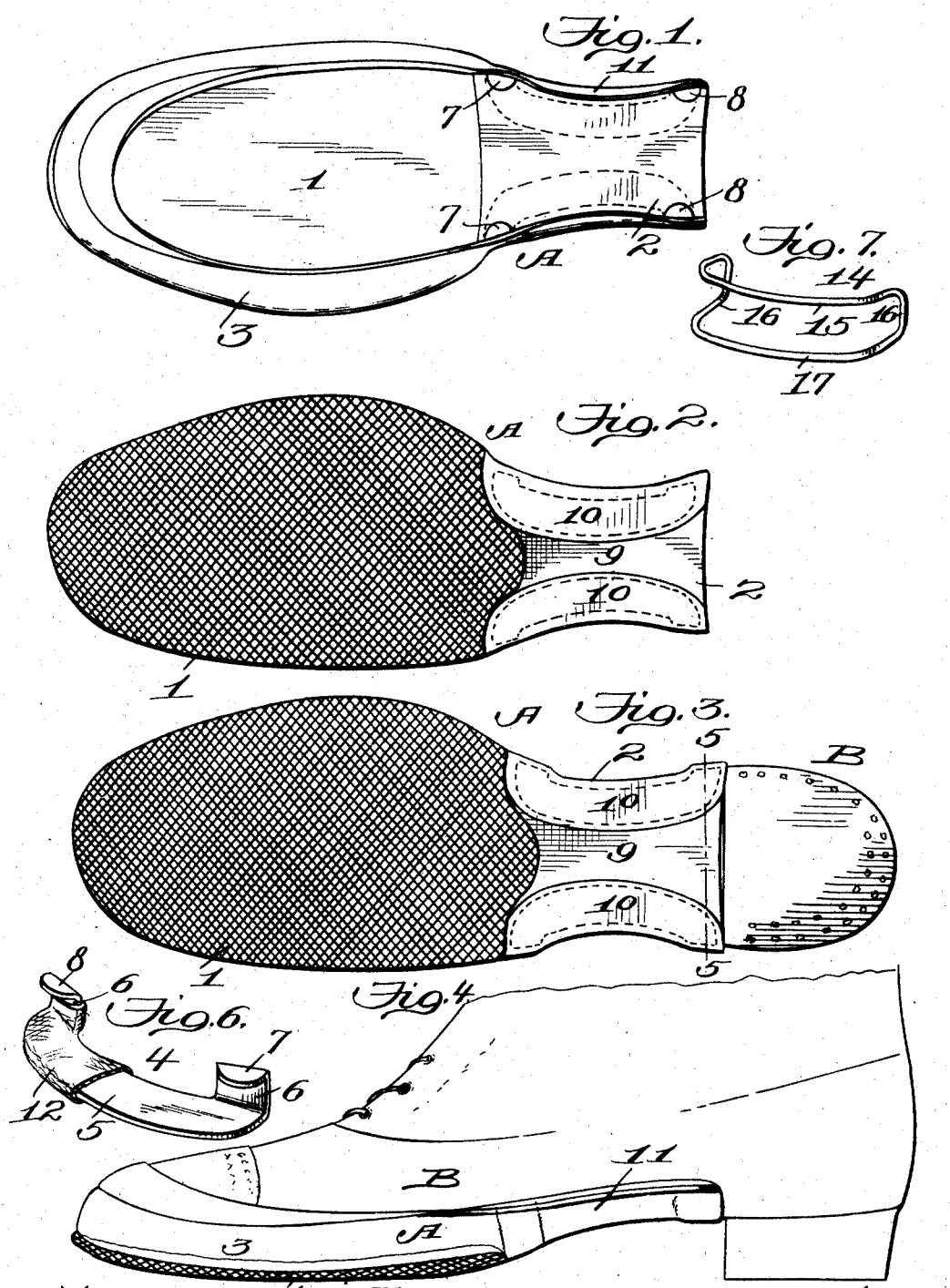

LAMBERT REED, OF LAMBERTVILLE, NEW JERSEY.

RUBBER OVERSHOE AND FASTENING DEVICE THEREFOR.

No. 927,282.  Specification of Letters Patent.  Patented July 6, 1909.

Application filed September 10, 1908. Serial No. 452,394.

*To all whom it may concern:*

Be it known that I, LAMBERT REED, a citizen of the United States, residing at Lambertville, in the county of Hunterdon and State of New Jersey, have invented new and useful Improvements in Rubber Overshoes and Fastening Devices Therefor, of which the following is a specification.

This invention relates to new and useful improvements in rubber overshoes and fastening devices therefor and it has more particular reference to a rubber overshoe in the nature of a sandal, and to improved coöperating side clips which securely fasten the overshoe to the shank of an apparel shoe. The fastening devices are constructed for quick and ready attachment to or detachment from said shank and toward this end the invention has as its primary object to provide fastening devices of novel construction and assemblage with relation to the overshoe.

The invention has as a further object to so assemble said fastening devices in the shank of the overshoe that a strong rubber web is disposed between the fastening devices, which web, by virtue of its resilient nature, acts to clamp said devices upon the shank.

The invention has as a further object to provide fastening means which will positively prevent slipping or creeping of the shoe and this object is carried out by a novel disposition of clips arranged in coöperating front and rear pairs, the construction and arrangement of parts being such that the spreading of either pair of clips, which will occur upon the slightest tendency of the overshoe to creep, will result in the other pair of clips tightening upon the shank of the shoe, whereby their frictional clamping action will be materially increased.

The invention finally aims to provide an overshoe and fastening means therefor which shall be inexpensive, durable, effective and practical, and this last object is accomplished by dispensing with all inclosed adjusting parts and by so constructing and assembling the fastening devices that they will not cut through the material of the overshoe.

The details of construction will be set forth in the following description, while the novel features of the invention will be defined in the claims hereunto appended.

The accompanying drawings, to which reference is had in the said description, illustrate a preferred and advantageous embodiment of the invention, but it is to be understood that the application of the invention is not limited to the form herein disclosed, such form being regarded merely as an advantageous example of the application of the principles involved.

In the said drawings:—Figure 1 is a top plan view of a rubber overshoe and its fastening means, made in accordance with the present invention. Fig. 2 is a bottom plan view thereof. Fig. 3 is a similar view showing the overshoe assembled upon an apparel shoe. Fig. 4 is a side elevation of the same. Fig. 5 is a cross section on the line 5—5 of Fig. 3, Fig. 6 is a detailed perspective view of one of the fastening clips embodied in the invention, the other clip being a counterpart in construction, and Fig. 7 is a detailed perspective view of a modified form of fastening clip which, however, embodies the basic principles of construction, assemblage and use, of the construction shown in Fig. 6.

Similar characters of reference refer to corresponding parts throughout the several views.

The improved overshoe is designated generally by the letter A and the apparel shoe by the letter B.

The overshoe A, as above intimated, is constructed in the nature of a sandal and comprises a sole portion 1 and a shank portion 2, the usual heel portion being omitted. This construction is permitted by reason of the particular construction and assemblage of the fastening devices, to be later described. The sole portion 1 is constructed with the usual retaining flange or wall 3 which is extended to form the sides of the shank portion 2.

The improved fastening means is constituted of two companion coöperating fastening attachments designated generally by 4, one of which is disposed at each side of the shank 2. By reference to Fig. 6 it will be seen that each clip 4 comprises an arcuate body 5 which is curved in conformity to the side walls or edges of the shank 2 and is disposed longitudinally therein, the body 5 being formed at its ends with laterally off-set perpendicular portions 6, each of which terminates in an inturned lug, the portions 6 forming with their lugs the fastening clips proper. The forward lugs on each attachment are designated 7 and the rearward lugs are designated 8.

The shank portion 2 is composed of comparatively thin elastic rubber, capable of being stretched laterally. Said shank portion comprises an intermediate solid web 9 which at each side is provided with integral overlapping laminæ 10 bent upwardly to form the sides 11 of said shank portion, which sides 11 are in effect integral continuations or extensions of the flange or wall 3. The web 9 is of substantial hour-glass shape, having a constricted central portion and larger end portions, this formation being defined by the opposite curvature of the side edges of said web, such side edges being curved conformably to the curvature of the adjacent edges of the bodies 5.

The attachments 4 are embedded longitudinally of the shank 2 between the laminæ 10 and are molded or vulcanized thereto. For the purpose of preventing the attachments from cutting through the material of the overshoe, sheathings 12, preferably of canvas, are employed which sheathings inclose the bodies 5 and perpendicular portions 6.

In attaching the overshoe A to an apparel shoe B, the sole of the latter is placed on the sole 1 and engaged under the flange or wall 3. The attachment 4 at one side of the shank 2 is then clamped upon the shank of the shoe B, by engaging the lugs 7 and 8 of such attachment upon the shank of the shoe B, the manner of such engagement being illustrated in Fig. 5. The shank 2 is then stretched laterally, by pulling upon the opposite unfastened side thereof, until the other attachment 4 clears the shank of the shoe B, at which time said remaining attachment is similarly clamped, i. e., by engaging its lugs 7 and 8 upon the shank of the shoe B, as above set forth.

In removing the overshoe, the shank 2 is stretched and an attachment 4 at one side thereof disengaged from the shank of the shoe B. The other attachment 4 is then similarly disengaged and the sole of the shoe B lifted from the sole 1.

In the introduction, the fastening clips were referred to as being disposed in coöperating front and rear pairs. From the foregoing description, it will be seen that the lugs 7 serve as the front pair of such clips, and the lugs 8, the rear pair. This coöperation between the clips, will be understood when it is considered that if the shoe A has any tendency to creep forward, the lugs 7 will be spread apart, owing to the curvature of the sides of the shank of the shoe B and to the elastic yielding nature of the web 9, and when such lugs are thus spread, the lugs 8 will be moved toward one another and clamped more firmly upon the shank of the shoe B. Such movement of the lugs 8, under the circumstances described, will be had by reason of the curved form of the bodies 5 and their longitudinal disposition in the laterally yielding elastic shank 2, which permits of the movement of the corresponding ends of the attachments 4 simultaneously away from and toward one another. Conversely, in the event of an imperfect fit between the shoes, due to inequality in lengths, and the shoe A has a tendency to creep rearwardly, the lugs 8 will be spread apart, and the lugs 7 moved together to clamp more firmly upon the shank of the shoe B. Thus it will be seen that the slightest movement of one pair of lugs 7 or 8 away from one another, produces corresponding movement of the other pair of lugs toward one another, thereby tightening their frictional grip. Hence any material creeping or slippage of the shoe A, such as would tend to inconvenience the wearer is positively guarded against.

When the shoe A is assembled upon the shoe B, the sides 11 of the shank 2 conceal the projecting lugs 7 and 8 and the perpendicular portions 6 of the fastening attachments, whereby the overshoe presents a neat appearance and does not differ in looks from those of ordinary construction, made in the accepted manner.

In addition to the advantages above set forth, the provision of the fastening attachments 4 causes the shank portion 2 to lie snugly under the arch of the shoe against the shank thereof, in such manner as to afford a positive seal against the entrance of water or slush between the soles of the shoes A and B. This action frequently occurs in the use of sandals as ordinarily constructed wherein the sole only is employed, without a shank portion, the sole being frequently ill-fitting and buckling at every step so as to allow of the passage of water thereinto.

The laminæ 10, inclosing the attachments 4, also prevent access of water or foreign matter to the latter and the rigid assemblage of the attachments 4 with respect to the laminæ is thus maintained at all times.

The modified form of fastening attachment illustrated in Fig. 7 and designated generally 14 while embodying the same general principles of construction and assemblage as the attachment 4 is made of spring wire and comprises an upper curved horizontal bar portion 15 terminating at its ends in U-shaped portions 16 which are offset laterally in vertical planes and on the same side of the portion 15 and constitute the fastening clips proper, in this function corresponding to the perpendicular portion 6 and the lugs 7 of the attachment 4. The clip portions 16 are each formed with angularly projecting end portions 17 which extend toward one another until they meet, and have the same degree of curvature as the bar portion 15. The portions 17 together form a lower bar portion, which owing to the increased length of the lower legs of the portions 16, is located some distance inwardly of the bar portion 15. The attachments 14 are embedded between the laminæ 10 and the side portions 11 thereof, in a manner similar to the attachments 4 and their relative disposition is the same as the relative disposition of said attachments 4. The advantages set forth in connection with the preferred form of the invention, are equally true of this modified form, which has the added advantage of resiliency and a certain degree of flexibility. As is well known, the curvature of the sides of the shanks of shoes of different styles varies and the flexible nature of the wire forming the attachment 14, permits of the upper bar portion being bent, to adjust or accommodate itself to different curvatures, as when the overshoe is used on different apparel shoes. In use, the bar portions 15 and the upper horizontal legs of the clip portions 16 engage over the shank of the apparel shoe, the overshoe being fitted thereon in the manner above set forth.

Having fully described my invention, I claim:—

1. In combination with an overshoe, having a sole portion and an elastic, laterally stretchable shank portion, the latter comprising a solid central web having overlapping laminæ at each side thereof, fastening devices disposed at each side of the shank portion and secured to and between the laminæ thereof, said fastening devices being constructed for engagement with the shank of a shoe.

2. In combination with an overshoe having a sole portion and an elastic, laterally stretchable shank portion, the latter comprising a solid web having overlapping laminæ at each side thereof, fastening devices disposed at each side of the shank portion and secured to and between the laminæ thereof, each fastening device comprising an arcuate body part having at its ends laterally offset perpendicular portions terminating in inturned lugs.

3. In combination with an overshoe having a sole portion and an elastic laterally stretchable shank portion secured to the sole portion, a metallic body embedded in the shank portion at each of its opposite sides, each body having projecting fastening means, and a sheathing inclosing said body to prevent the same from cutting through the material in which it is embedded.

4. In combination with an overshoe having a sole portion and an elastic laterally stretchable shank portion secured to the sole portion and comprising a central solid web of substantial hour-glass shape and overlapping laminæ at each side of said web, fastening devices comprising arcuate body parts secured between the laminæ at each side of said web and projecting fastening clips carried by the body parts.

5. In combination with an overshoe having a sole portion and an elastic laterally stretchable shank portion secured to the sole portion and comprising a central solid web having overlapping laminæ at each side thereof, said laminæ being bent upwardly to form sides for said shank portion and fastening devices secured to and between the laminæ at each side of the web and comprising metallic body parts having perpendicular portions confined between the upwardly bent portions of the laminæ and inwardly turned lugs, forming the terminations of said perpendicular portions.

6. The combination with an over-shoe having a sole portion and an elastic laterally stretchable shank portion secured to the sole portion, of a fastening clip secured at each side of the stretchable portion and comprising a longitudinally disposed body portion terminating at its ends in angularly disposed gripping lugs, said shank portion having an elastic web intervening between said clips.

7. The combination with an over-shoe having a sole portion and an elastic laterally stretchable shank portion secured to the sole portion, of a fastening clip secured at each side of the shank portion and comprising a curved body portion terminating at its ends in angular gripping lugs, said clips being disposed longitudinally of said shank portion and conforming to the curvature of the sides thereof whereby an intervening web of substantial hour-glass shape is afforded.

8. The combination with an apparel shoe of a member for attachment to the sole thereof and including an elastic laterally stretchable portion, a metallic body portion embodied in said elastic portion at each of its opposite sides, each body having projecting fastening means, and a sheathing inclosing said body to prevent the same from cutting through the material in which it is embedded.

9. The combination with an apparel shoe of a member for attachment to the sole thereof and including an elastic laterally stretchable portion, the latter comprising a solid web having overlapping laminæ at each side thereof, and fastening devices disposed at each side of said portion and secured to and between the laminæ thereof, said fastening devices being constructed for gripping engagement with the projecting edge portions of the sole of the apparel shoe.

10. The combination with an overshoe having a sole portion and an elastic laterally stretchable shank portion secured to the sole portion, of angular metallic fastening lugs secured at each side of the shank portion and arranged in front and rear pairs; the lugs of the front pair gripping the shoe at the front end of the shank and preventing forward creeping of the overshoe, and the lugs of the rear pair holding the rear end of the shank portion in contact with the shank of the shoe.

In testimony whereof I have hereunto set my hand in presence of two subscribing witnesses.

LAMBERT REED.

Witnesses:
CHARLOTTE LYMAN,
WM. LYMAN.